(12) United States Patent
Smoot

(10) Patent No.: US 8,585,073 B2
(45) Date of Patent: Nov. 19, 2013

(54) SELF-LOCKING HITCH PIN

(76) Inventor: Max M. Smoot, Loveland, CO (US)

(*) Notice: Subject to any disclaimer, the term of this patent is extended or adjusted under 35 U.S.C. 154(b) by 0 days.

(21) Appl. No.: 13/495,730

(22) Filed: Jun. 13, 2012

(65) Prior Publication Data

US 2012/0256393 A1    Oct. 11, 2012

Related U.S. Application Data

(63) Continuation of application No. 13/084,405, filed on Apr. 11, 2011, now Pat. No. 8,201,844.

(51) Int. Cl.
*B60D 1/02* (2006.01)

(52) U.S. Cl.
USPC ......... 280/491.5; 280/507; 403/324; 411/351

(58) Field of Classification Search
USPC ............... 280/491.5, 506, 507, 515; 403/324, 403/325; 411/351
See application file for complete search history.

(56) References Cited

U.S. PATENT DOCUMENTS

| | | | | |
|---|---|---|---|---|
| 3,865,407 A * | 2/1975 | Klassen | | 280/515 |
| 4,087,112 A * | 5/1978 | Lee, Jr. | | 280/515 |
| 4,526,396 A * | 7/1985 | Mayer | | 280/515 |
| 4,840,528 A * | 6/1989 | Doom | | 411/351 |
| 4,890,854 A * | 1/1990 | Hoover | | 280/504 |
| 5,199,733 A * | 4/1993 | DeLorme | | 280/515 |
| 6,092,264 A * | 7/2000 | Banks | | 16/321 |
| 6,193,260 B1 * | 2/2001 | Homan et al. | | 280/515 |
| 6,409,203 B1 * | 6/2002 | Williams | | 280/506 |
| 6,609,725 B1 * | 8/2003 | Williams | | 280/506 |
| 6,945,550 B2 * | 9/2005 | Williams | | 280/506 |
| 7,338,065 B1 * | 3/2008 | Clausen | | 280/507 |
| 7,568,718 B1 * | 8/2009 | Thomas | | 280/507 |
| 2004/0104558 A1 * | 6/2004 | Williams | | 280/506 |
| 2004/0265049 A1 * | 12/2004 | Hohmann et al. | | 403/153 |
| 2007/0262563 A1 * | 11/2007 | Williams | | 280/506 |

FOREIGN PATENT DOCUMENTS

| | | | |
|---|---|---|---|
| DE | 849657 | * | 9/1952 |
| DE | 938288 | * | 1/1956 |
| DK | 91256 | * | 7/1961 |
| GB | 1011329 | * | 11/1965 |

OTHER PUBLICATIONS

U.S. Appl. No. 13/084,405, filed Apr. 11, 2011.

* cited by examiner

*Primary Examiner* — Kevin Hurley

(57) ABSTRACT

Disclosed is a self-locking hitch pin for joining a hitch device to a receiver hitch in a quick and easy manner using a single, self-contained mechanism. The hitch pin is comprised of shaft with a locking member on one end and a handle and weight on the other end and a spring and retainers to keep the hitch pin in place. The self-locking hitch pin allows for single-handed installation and securing of a hitch device to a receiver hitch with no pin or locking mechanism to be lost or dropped. The self-locking hitch pin can be inserted into the hitch orifice, have pressure applied to the spring, rotate the hitch pin allowing gravity to engage the locking member and then release pressure on the spring coupling both devices together.

11 Claims, 3 Drawing Sheets

SELF-LOCKING HITCH PIN

This United States Patent Application is a continuation of U.S. patent application Ser. No. 13/084,405, filed Apr. 11, 2011, hereby incorporated by reference herein.

BACKGROUND

The present invention relates generally to the field of hitch pins and other locking or securing devices used for the coupling of receiver members to a receiver hitch. Many vehicles are equipped with receiver style hitch assemblies made from 1 or 2 inch square tubing mounted to the undercarriage of a vehicle. A second tube slides inside the receiver and is secured by a hitch pin. Conventional hitch pins for securing a ball mount to a receiver hitch rely on a pin and clip to physically secure the two items together. Pin and clip securing systems typically rely on an angled end to prevent movement in the hitch assembly and rely on a locking pin or clip to prevent the pin from exiting the system. A major disadvantage of this type of system is the installation requires two hands, good visibility and a need to keep track of an, easily lost, locking mechanism. A hitch pin may also be lost during transport of a trailer resulting in the trailer being forcibly removed from the towing vehicle resulting in loss of property or worse.

SUMMARY

An embodiment of the present invention may therefore comprise a self locking hitch pin comprising: a locking member comprising a distal cylindrical portion connected to a proximal locking member plate; a shaft with a channel pivotally connected to the locking member plate; a shaft abutment surface on a distal end of the shaft that engages with a mating surface on the locking member such that the shaft and the locking member are fixed in a coaxial orientation when the axis of the shaft is rotated to a first position, and the locking member that may freely pivot to a perpendicular orientation to the shaft when the axis of the shaft is rotated to a second position; and, a retainer compressively held in place with respect to the shaft on the proximal side of the shaft with a compressive mechanism.

An embodiment of the present invention may also comprise a method of securing a hitch device to a receiver hitch comprising the steps: providing a self-locking hitch pin comprising a locking member with a distal cylindrical portion connected to a proximal plate that is pivotally connected to a shaft within a channel, the locking member that engages with the shaft in a coaxial orientation to form a substantially cylindrical rod when an axis of the shaft is rotated in a first position, and the locking member that may freely pivot to a perpendicular orientation to the shaft when the axis of the shaft is rotated in a second position; inserting the locking member and then the shaft of the self-locking hitch pin while oriented in the first position through a first side of a receiver orifice and hitch orifice to a sufficient distance such that the locking member may freely pivot on an opposite side of the receiver orifice from the first side; rotating the shaft to the second position thereby allowing the locking member to pivot to the perpendicular orientation on the opposite side of the receiver orifice thereby preventing extraction of the shaft from the receiver orifice and the hitch orifice; and, retaining the shaft on the first side of the receiver orifice with a retainer compressively held in place with a compressive mechanism with respect to the shaft.

An embodiment of the present invention may also comprise a self-locking hitch pin for securing a hitch device to a receiver hitch: a means for providing a self-locking hitch pin comprising a locking member with a distal cylindrical portion connected to a proximal plate that is pivotally connected to a shaft within a channel, the locking member that engages with the shaft in a coaxial orientation to form a substantially cylindrical rod when an axis of the shaft is rotated in a first position, and the locking member that may freely pivot to a perpendicular orientation to the shaft when the axis of the shaft is rotated in a second position; a means for inserting the locking member and then the shaft of the self-locking hitch pin while oriented in the first position through a first side of a receiver orifice and hitch orifice to a sufficient distance such that the locking member may freely pivot on an opposite side of the receiver orifice from the first side; a means for rotating the shaft to the second position thereby allowing the locking member to pivot to the perpendicular orientation on the opposite side of the receiver orifice thereby preventing extraction of the shaft from the receiver orifice and the hitch orifice; and, a means for retaining the shaft on the first side of the receiver orifice with a retainer compressively held in place with a compressive mechanism with respect to the shaft.

DETAILED DESCRIPTION OF THE EMBODIMENTS

Figure 1:
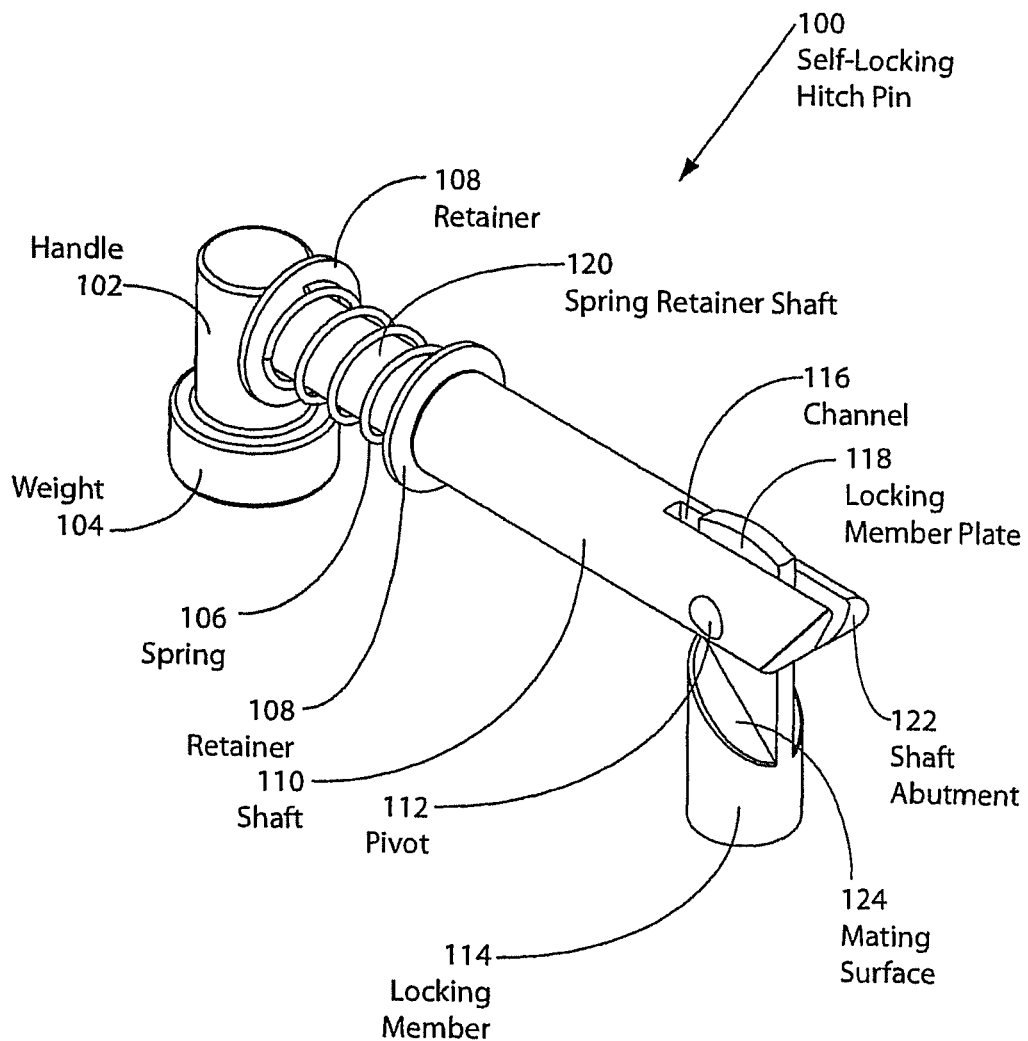
FIG. 1 is an isometric illustration of an embodiment of a self-locking hitch pin.

While this invention is susceptible to embodiment in many different forms, it is shown in the drawings, and will be described herein in detail, specific embodiments thereof with the understanding that the present disclosure is to be considered as an exemplification of the principles of the invention and is not to be limited to the specific embodiments described.

FIG. 1 is an isometric illustration of a self-locking hitch pin in insertion position. The hitch pin 100 comprises a dual-diameter cylindrical shaft that engages the hitch and receiver with a standard hitch pin diameter engagement shaft 110 (typically ⅝" but not limited by example) and a spring retainer shaft 120 which is an addition to the shaft 110 that extends beyond the confines of the receiver orifice. This spring retainer shaft 120 is, in this particular embodiment, smaller in diameter, and coaxial with the engagement shaft 110. However, in an alternate embodiment, spring retainer shaft 120 and engagement shaft 110 may be the same diameter. The spring retainer shaft 120 connects at an approximately normal angle with a handle member 102 which extends away from the shaft angle and contains an orienting weight 104 at the distal end of the handle member 102.

In this embodiment, a pair of retainers 108 are placed on either side of a spring 106 which all lie coaxially around the spring retainer shaft 120. These retainers 108 are retained in relaxed position by the perpendicular surface of the handle portion 102 on the distal end and by a shoulder 122 (the larger diameter interface of the engagement shaft 110) on the proximal end of the spring retainer shaft 120. Although this is referred to as a relaxed position or state, there will typically be a small amount of compressive load by the retainers 108 as they retain the spring 106. Typically, the inner diameter of the retainers 108 are closely matched to the outer diameter of the spring retainer shaft 120 so as allow movement of the proximal washer in relation to the spring retainer shaft 120, while preventing a sloppy interface and orientation between the two parts as they engage. Additionally, spring retainers 108 or equivalent mechanism for retaining the spring 106, may be integrated into the spring retainer shaft 120 or the handle 102. In an alternate embodiment, retainer 108 could be incorporated into the spring or omitted entirely.

The proximal end of the engagement shaft 110 contains a locking member 114 which is pivotally connected to engagement shaft 110 via pivot 112 which allows free pivot motion of the locking member 114 on the proximate end of the engagement shaft 110. The locking member 114 contains a cylindrical portion which typically matches the diameter of the engagement shaft 110 on the proximal end, and pivotally interfaces with the engagement shaft 110 with a locking member plate 118, which is shown as a flat rectangular cross section retained within a matching channel 116 on the engagement shaft 110 and pivotally anchored with pivot 112.

Figure 2:
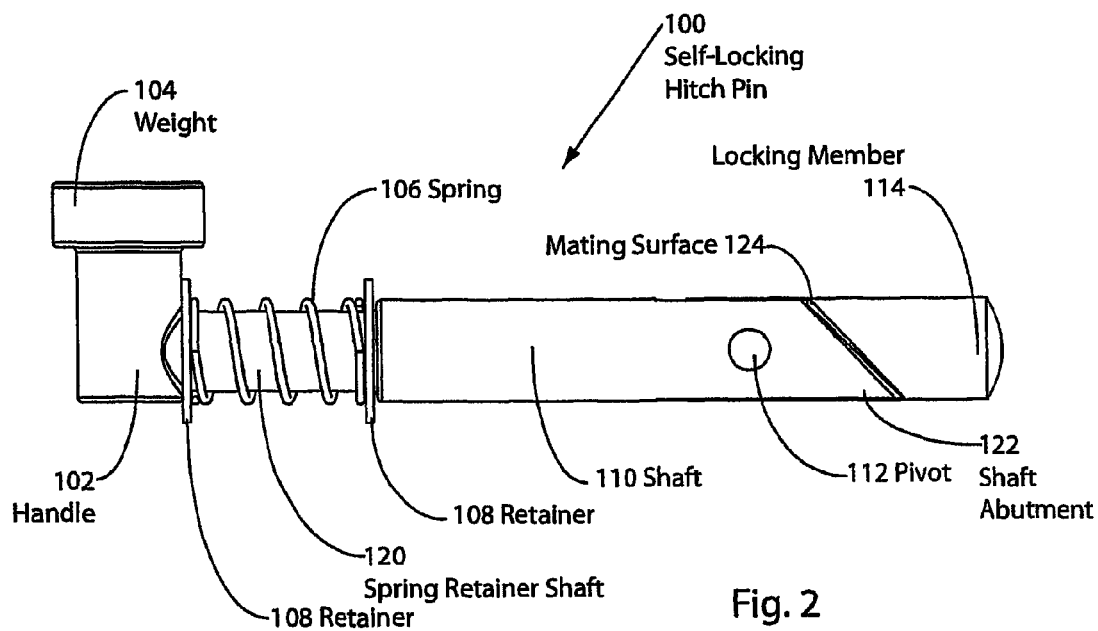
FIG. 2 is a side view of a self-locking hitch pin in insertion position.

The channel 116 is centrally aligned on the engagement shaft 110 in an orientation such that the slot extends approximately parallel to the handle axis. In this manner, the locking member 114 may freely pivot from a coaxial orientation with the engagement shaft 110 (acting as if it were a longer constant diameter shaft), to a perpendicular orientation with the engagement shaft 110 and extending in the same direction, and parallel to, the handle and orienting weight 104. In order to control the positioning of the cylindrical locking member 114 with respect to the cylindrical engagement shaft 110, at least one of the lateral distal surfaces of the locking member plate 118 and a matching proximal lateral surface of the engagement shaft 110, are matched or mated, to prevent motion of the locking member 114 past 180 degree (coaxial) alignment establishing an "insertion" position or state (FIG. 2). In this insertion state, the mating surface on the locking member 114 is a mating surface 124 which approximately matches and engages the surface of the shaft abutment 122.

FIG. 2 is a side view of a lockable hitch pin in insertion position. When the self-locking hitch pin 100 is inserted into a receiver (FIG. 4), the hitch pin 100 is oriented as shown in FIG. 2, with weight 104 oriented substantially vertically upwards. In this orientation, the weight of the locking member 114 allows it to rotate about pivot 112 until the mating surface 124 engages the shaft abutment 122. At this point, the hitch pin 100 effectively forms a cylindrical shaft of approximately constant diameter which is easily inserted into the cylindrical orifice formed between a receiver and a hitch.

Figure 3:
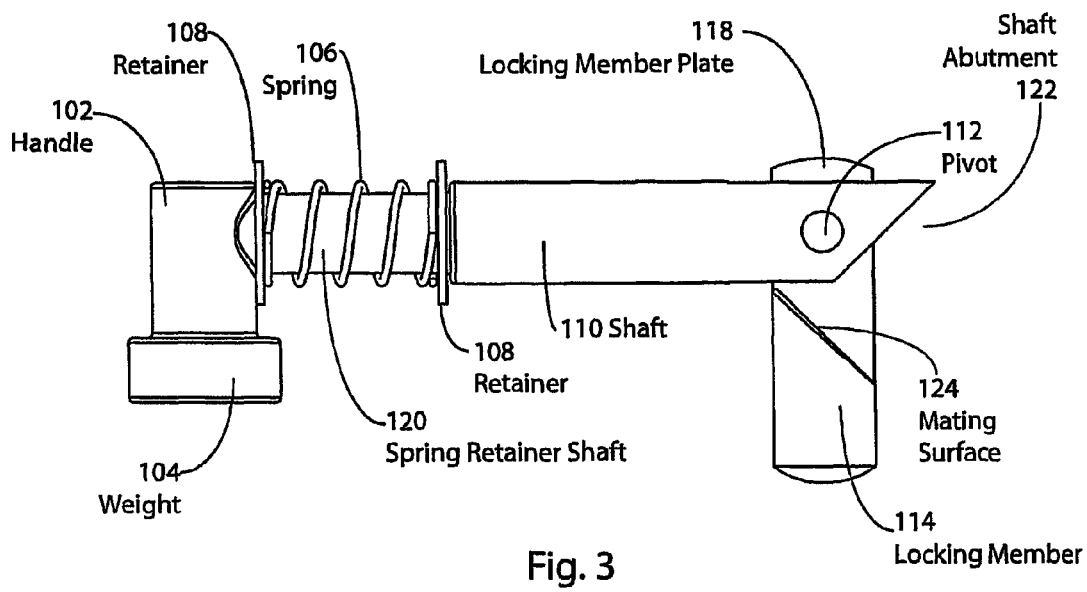
FIG. 3 is a side view of a self-locking hitch pin in lockable position.

FIG. 3 is a side view of a self-locking hitch pin in lockable position. When the self-locking hitch pin 100 has been inserted with sufficient force to compress spring 106 and sufficient distance for locking member 114 to clear the receiver, weight 104 may be rotated to a substantially downward orientation (FIG. 3).

Figure 4:
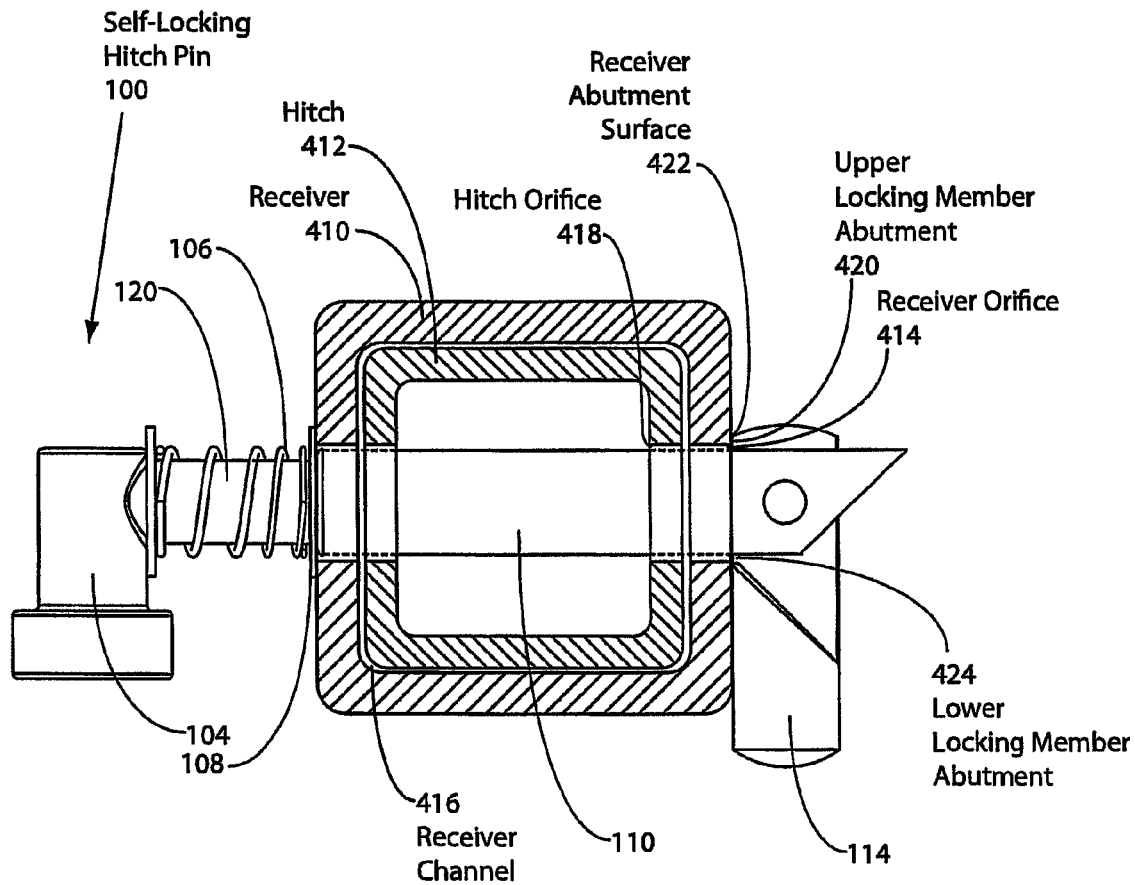
FIG. 4 is illustrates the receiver hitch orifice and receiver hitch assembly fixed in place with respect to one another with a self-locking hitch pin.

FIG. 4 is a diagram illustrating the receiver hitch orifice and receiver hitch assembly. Hitch 412 is operatively coupled to receiver 410 and is secured together by shaft 110 through receiver orifice 414. Hitch 412 is inserted into receiver channel 416 until receiver orifice 414 is aligned with hitch orifice 418 to allow hitch pin 100 to be inserted. In order for hitch pin 110 to be secured in place, receiver abutment surface 422 engages with upper locking member abutment 420 and lower locking member abutment 424 putting hitch pin 100 in insertion position (FIG. 2).

When used to retain a hitch, the hitch pin 100 is inserted into the orifice formed between the receiver and hitch, thereby locking these members in place with respect to one another. The length of shaft 110 is set to approximately match or be slightly shorter than the width of the receiver such that when the shaft 110 is inserted to a point beyond the transition from shaft 110 to the spring retainer shaft 120, the retainer 108 engages the receiver, and compresses spring 106. Pressure is applied to handle 102 thereby compressing the spring 106. Sufficient pressure is applied to allow locking member 114, and subsequently locking member abutment 420, sufficient space for locking member abutment 420 to clear receiver abutment surface 422. Once the receiver overlaps the spring retainer shaft 120 and the spring 106 is compressed and upper locking member abutment 420 has cleared receiver abutment surface 422, the handle 102 is rotated 180 degrees in either direction, and the locking member 114 is free to pivot by 90 degrees on the opposite side of the receiver and released, displayed as FIG. 3. At this point, one side of the hitch 412 is retained by retainer 108 which is held by spring 106, and the other side is captured by the locking member plate 118 which is now perpendicular to the shaft 110 within the receiver 410 and hitch 412. Upper locking member abutment 420 and lower locking member abutment 424 are interfaced and secured to receiver abutment surface 422 by the pressure from the spring 106. The weight 104 on the distal end of the handle 102 assists in maintaining the orientation of the hitch pin 100 as shown in FIG. 3 when retaining a hitch into a receiver.

To remove the hitch pin 100 and disengage the hitch from the receiver, the handle 102 is rotated 180 degrees in either direction to orient it upward. Pressure is then or simultaneously applied to the handle 102 towards the receiver 410 thereby displacing the retainer 108 and compressing spring 106. Once the receiver 410 overlaps the spring retainer shaft 120 and upper locking member abutment 420 and receiver abutment 422 disconnect, the locking member is free to pivot by 90 degrees by gravity, the hitch pin 100 returns to the position shown in FIG. 2 and can be easily removed from the engagement between the hitch 412 and receiver 416.

In one embodiment, pivot 112 is further enhanced with a hollow orifice of adequate size to allow a locking mechanism to pass through the orifice securing hitch pin 100 to receiver 410.

In the present embodiment, the spring 106 is shown as a helical spring, however, any type of compressive member which exerts and elastic force on retainer 108 may be contemplated (e.g. elastomeric members, elastic hydrocarbon polymers, expansive pins, or the like).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:
1. A hitch pin comprising:
   a shaft having a proximal end and a distal end defining a longitudinal axis;
   a locking member pivotally coupled to said distal end of said shaft, said locking member pivoting freely between a first orientation and a second orientation in response to rotation of said shaft about said longitudinal axis;

a retainer positioned along said shaft between said proximal end and said distal end of said shaft; and a compressive member engaged with said retainer, said compressive member compressed upon movement of said retainer toward said proximal end of said shaft.

2. The hitch pin of claim 1, wherein said first orientation of said locking member allows for insertion and removal of said hitch pin into a receiver hitch orifice of a receiver hitch.

3. The hitch pin of claim 2, wherein insertion of said hitch pin into said receiver hitch orifice engages said retainer with a first side of said receiver hitch to move said retainer toward said proximal end of said shaft.

4. The hitch pin of claim 3, wherein said second orientation of said locking member locks said hitch pin in fixed positional relation to said receiver hitch orifice of said receiver hitch.

5. The hitch pin of claim 4, wherein said locking member comprises a locking member plate pivotally coupled within a channel at said distal end of said shaft.

6. The hitch pin of claim 5, wherein said locking member further comprises a cylindrical portion, said shaft and said locking member in said first orientation forming in co-axial relation a substantially cylindrical rod.

7. The hitch pin of claim 6, further comprising a shaft abutment surface on said distal end of said shaft which engages a mating surface on said locking member to establish said coaxial orientation of said locking member with said shaft.

8. The hitch pin of claim 7, wherein said shaft comprises an engagement shaft co-axially coupled to a spring retainer shaft of lesser diameter, said engagement shaft configured to insert into said receiver hitch orifice, said spring retainer shaft configured to extend outward of said receiver hitch orifice, compressive member comprises a spring which compressively positions said retainer against said engagement shaft.

9. The hitch pin of claim 8, further comprising a handle coupled to said proximal end of said shaft.

10. The hitch pin of claim 9, further comprising a weight coupled to said handle, said weight under force of gravity acts on said handle to preferentially rotate said shaft inserted into said receiver hitch orifice to position said locking member in said second orientation.

11. The hitch pin of claim 10, wherein said compressive member compresses between said handle and said retainer.

\* \* \* \* \*